(12) United States Patent
Chen

(10) Patent No.: US 10,983,282 B2
(45) Date of Patent: Apr. 20, 2021

(54) DIRECT COUPLING FIBER-DEVICE STRUCTURE

(71) Applicant: MIKRO MESA TECHNOLOGY CO., LTD., Apia (WS)

(72) Inventor: Li-Yi Chen, Tainan (TW)

(73) Assignee: MIKRO MESA TECHNOLOGY CO., LTD., Apia (WS)

( * ) Notice: Subject to any disclaimer, the term of this patent is extended or adjusted under 35 U.S.C. 154(b) by 26 days.

(21) Appl. No.: 16/508,324

(22) Filed: Jul. 11, 2019

(65) Prior Publication Data

US 2021/0011232 A1    Jan. 14, 2021

(51) Int. Cl.
*G02B 6/30* (2006.01)
*G02B 6/42* (2006.01)
*G01H 9/00* (2006.01)

(52) U.S. Cl.
CPC .............. *G02B 6/30* (2013.01); *G02B 6/4204* (2013.01); *G02B 6/4224* (2013.01); *G01H 9/004* (2013.01)

(58) Field of Classification Search
CPC .. G02B 6/4204; G02B 6/4214; G02B 6/4224; G02B 6/30; G01H 9/004
USPC .......................... 385/49–52, 88–92, 123–128
See application file for complete search history.

(56) References Cited

U.S. PATENT DOCUMENTS

2001/0028761 A1* 10/2001 Imada ...................... G02B 6/32
385/35

* cited by examiner

*Primary Examiner* — Michael P Mooney
(74) *Attorney, Agent, or Firm* — CKC & Partners Co., LLC

(57) ABSTRACT

A direct coupling fiber-device structure including an optical fiber and a micro device is provided. The optical fiber has a first end, a second end opposite to the first end, and an inner cavity recessed from the first end. The micro device is in the inner cavity. The micro device has a first surface and a second surface. The first surface is substantially facing away from the first end. The second surface is opposite to the first surface and facing toward the first end.

18 Claims, 6 Drawing Sheets

DIRECT COUPLING FIBER-DEVICE STRUCTURE

BACKGROUND

Field of Invention

The present disclosure relates to a direct coupling fiber-device structure.

Description of Related Art

The statements in this section merely provide background information related to the present disclosure and do not necessarily constitute prior art.

In recent years, micro devices have become popular in general and commercial lighting applications. As a size of one device continue to shrink down, new issues emerge. For example, in light measurement applications, one of the traditional light measurements may be performed by an integrating sphere including an optical component consisting of a hollow spherical cavity with its interior covered with a reflective/diffusive white coating, and with small holes for entrance and exit ports. However, for a micro size LED (e.g., a micro LED), an intensity of light emitted therefrom may be too small for traditional light measurement equipment or method to give a thorough and detailed analysis of lighting properties of the micro size LED.

SUMMARY

According to some embodiments of the present disclosure, a direct coupling fiber-device structure is provided. The direct coupling fiber-device structure includes an optical fiber and a micro device. The optical fiber has a first end, a second end opposite to the first end, and an inner cavity recessed from the first end. The micro device is in the inner cavity. The micro device has a first surface and a second surface. The first surface substantially faces away from the first end. The second surface is opposite to the first surface and faces toward the first end.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
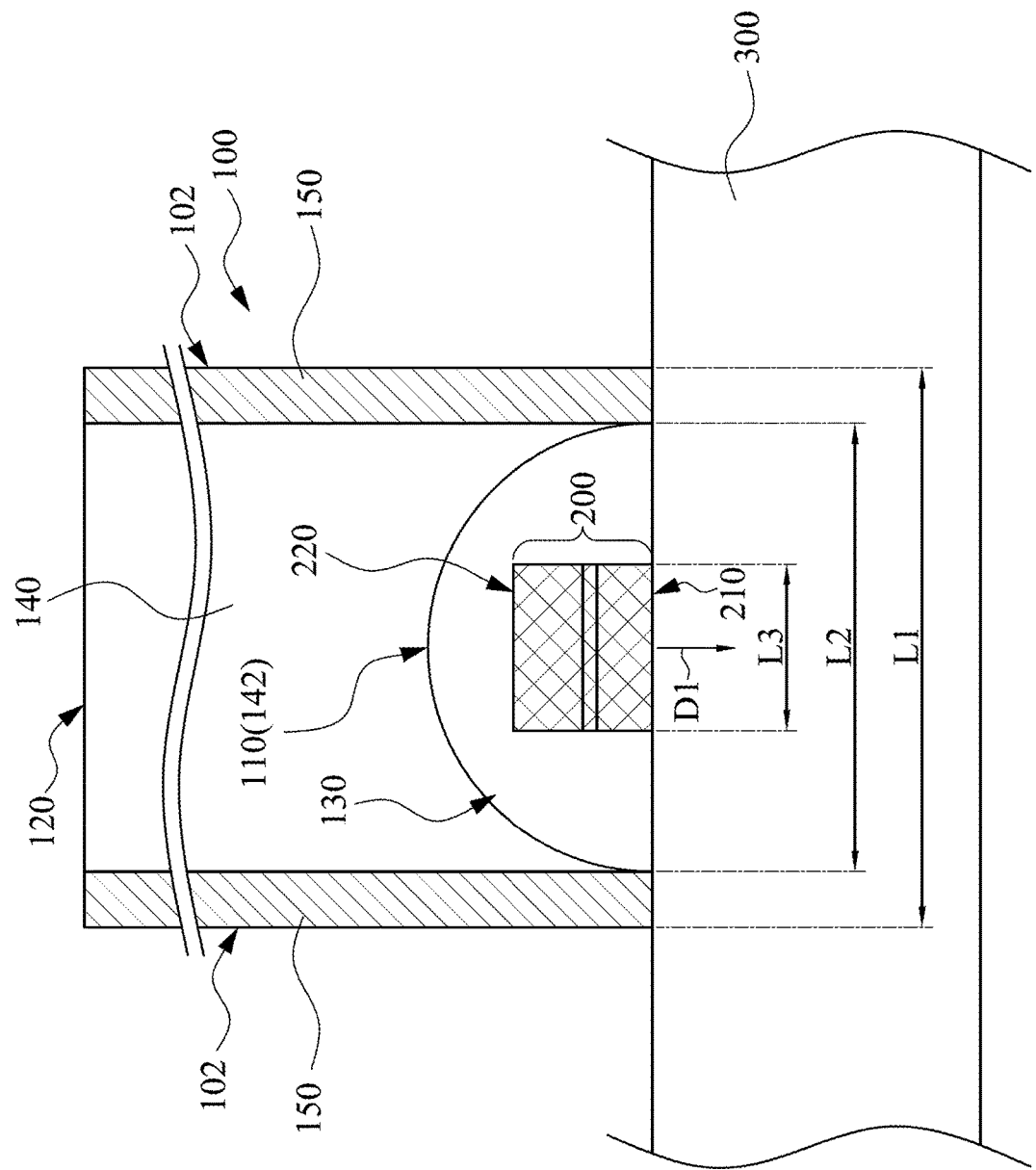
FIG. 1 is a schematic cross-sectional view of a direct coupling fiber-device structure according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In various embodiments, the description is made with reference to figures. However, certain embodiments may be practiced without one or more of these specific details, or in combination with other known methods and configurations. In the following description, numerous specific details are set forth, such as specific configurations, dimensions, and processes, etc., in order to provide a thorough understanding of the present disclosure. In other instances, well-known semiconductor processes and manufacturing techniques have not been described in particular detail in order to not unnecessarily obscure the present disclosure. Reference throughout this specification to "one embodiment," "an embodiment" or the like means that a particular feature, structure, configuration, or characteristic described in connection with the embodiment is included in at least one embodiment of the disclosure. Thus, the appearances of the phrase "in one embodiment," "in an embodiment" or the like in various places throughout this specification are not necessarily referring to the same embodiment of the disclosure. Furthermore, the particular features, structures, configurations, or characteristics may be combined in any suitable manner in one or more embodiments.

The terms "over," "to," "between" and "on" as used herein may refer to a relative position of one layer with respect to other layers. One layer "over" or "on" another layer or bonded "to" another layer may be directly in contact with the other layer or may have one or more intervening layers. One layer "between" layers may be directly in contact with the layers or may have one or more intervening layers.

Reference is made to FIG. 1. FIG. 1 is a schematic cross-sectional view of a direct coupling fiber-device structure 1000 according to some embodiments of the present disclosure. In some embodiments, the direct coupling fiber-device structure 1000 includes an optical fiber 100 and a micro device 200. The optical fiber 100 has a first end 110, a second end 120 opposite to the first end 110, and an inner cavity 130 recessed from the first end 110. The micro device 200 is in the inner cavity 130. The micro device 200 has a first surface 210 and a second surface 220. The first surface 210 is substantially facing away from the first end 110. The second surface 220 is opposite to the first surface 210 and facing toward the first end 110. Specifically, the "substantially facing away from the first end 110" is that the first surface 210 of the micro device 200 faces away from the optical fiber 100 in about a direction D1 as shown in FIG. 1. Surfaces other than the first surface 210 of the micro device 200 (e.g., the second surface 220 or side surfaces (not explicitly indicated in figures) of the micro device 200) cannot be interpreted as "substantially facing away from the first end 110" since they all somewhat face toward the first end 110 of the optical fiber 100 (see FIG. 1).

In some embodiments, the optical fiber 100 includes a core portion 140 and a cladding layer 150. The cladding layer 150 wraps the core portion 140. The cladding layer 150 is configured to confine a light beam to propagate within the core portion 140. In some embodiments, a refractive index of the cladding layer 150 is smaller than a refractive index of the core portion 140 so as to create a total reflection when the light beam propagates from the core portion 140 to the cladding layer 150. In some embodiments, the core portion 140 is made of fused silica, which can be etched to form the inner cavity 130. In some embodiments, the cladding layer 150 is made of silicon dioxide ($SiO_2$) or plastics, but should not be limited thereto. In some embodiments, the core portion 140 has a curved surface 142 at the first end 110 of the optical fiber 100. The curved surface 142 forms at least a part of the inner cavity 130. In general cases, the curved surface 142 of the core portion 140 is conformal to the first end 110 of the optical fiber 100. In some embodiments, a shape of the curved surface 142 is hemispherical.

In some embodiments, a lateral length L1 of the optical fiber 100 is greater than or equal to a lateral length L2 of the inner cavity 130. In some embodiments, a lateral length L3 of the micro device 200 is smaller than the lateral length L1 of the optical fiber 100. In some embodiments, the lateral length L3 of the micro device 200 is smaller than the lateral length L2 of the inner cavity 130. In some embodiments, the micro device 200 is a micro light-emitting device. In some other embodiments, the micro device 200 is a photo detecting device that acts as a sensor for an optical fiber communication. In some embodiments, the micro device 200 can be operated as a micro light-emitting device or a photo detecting device according to practical applications. In some embodiments, the lateral length L3 of the micro device 200 is smaller than or equal to about 100 μm. Each conditions or more than two conditions in combinations as mentioned above can be used to realize placing the micro device 200 into the inner cavity 130 of the optical fiber 100, so as to enhance the light collection from a single micro device 200 or to receive more light from the optical fiber 100 compared to a traditional method (structure) in which a flat surface of a traditional optical fiber is operated to be in proximity to a device under detection. The embodiments as mentioned is especially useful for a device with micro size (e.g., the micro device 200, particularly the micro light-emitting device) since an intensity of light emitted from a single micro light-emitting device is much smaller than a traditional light-emitting device, and thus it is much harder to make a detailed analysis of photoelectric characteristics of the single micro light-emitting diode. Furthermore, the embodiments as mentioned is not applicable to traditional light-emitting devices since a size of the traditional light-emitting devices is too large to be put into the inner cavity 130 of the optical fiber 100 as mentioned.

In some embodiments, the direct coupling fiber-device structure 1000 further includes a base portion 300 in contact with the first end 110. The micro device 200 is between the first end 110 and the base portion 300. In some embodiments, the base portion 300 is in contact with the first surface 210 of the micro device 200. In some embodiments, the micro device 200 is enclosed by the first end 110 and the base portion 300. Specifically, the micro device 200 is fully packed or even sealed in the inner cavity 130.

Figure 2:
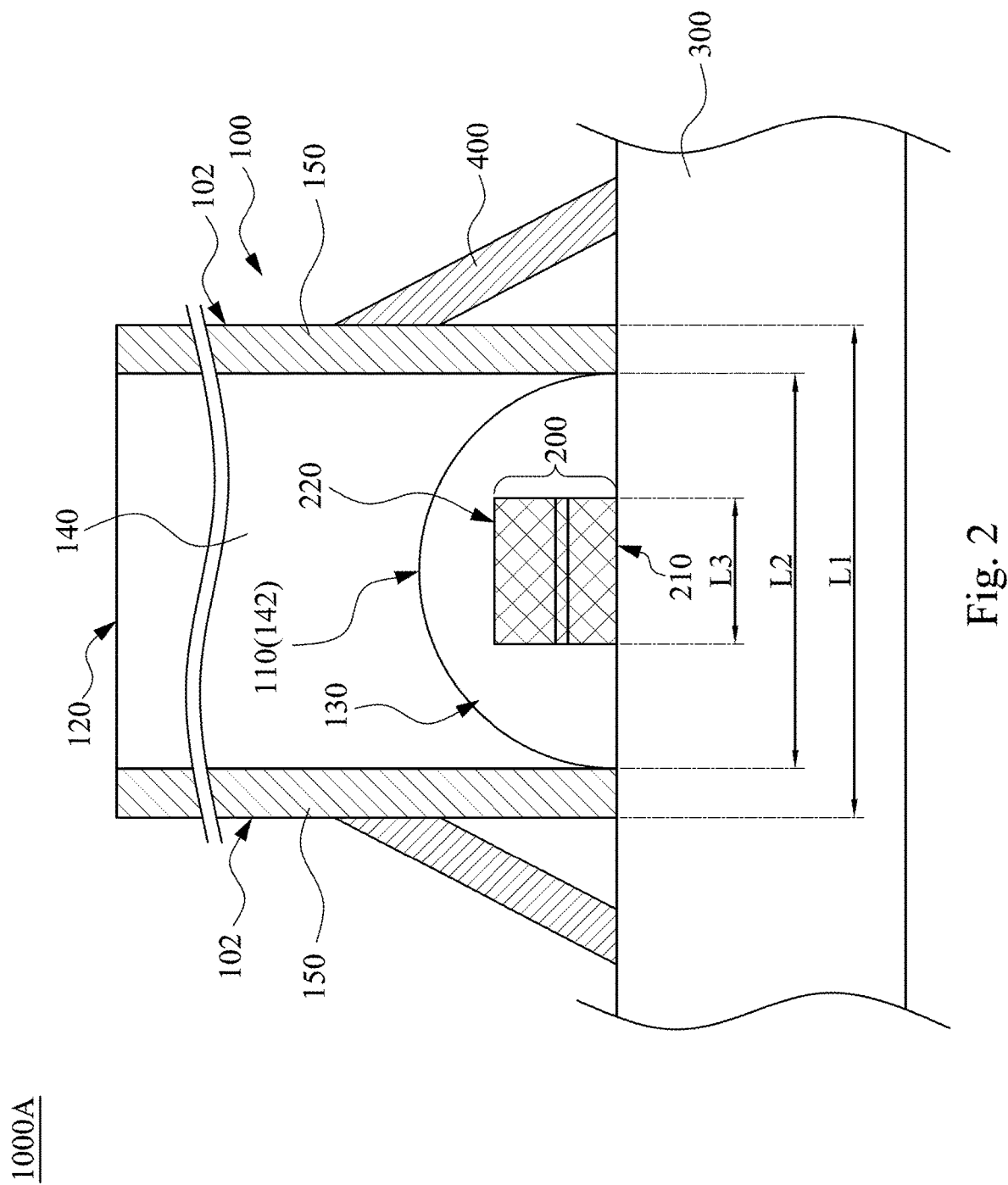
FIG. 2 is a schematic cross-sectional view of a direct coupling fiber-device structure according to some embodiments of the present disclosure.

Reference is made to FIG. 2. FIG. 2 is a schematic cross-sectional view of a direct coupling fiber-device structure 1000A according to some embodiments of the present disclosure. In some embodiments, the direct coupling fiber-device structure 1000A further includes a supporting element 400 as compared to the direct coupling fiber-device structure 1000. The supporting element 400 may be a mechanical support element made of epoxy, but should not be limited thereto. The supporting element 400 connects the optical fiber 100 and the base portion 300 to support the optical fiber 100. The supporting element 400 is in contact with an outer periphery 102 of the optical fiber 100.

Figure 3:
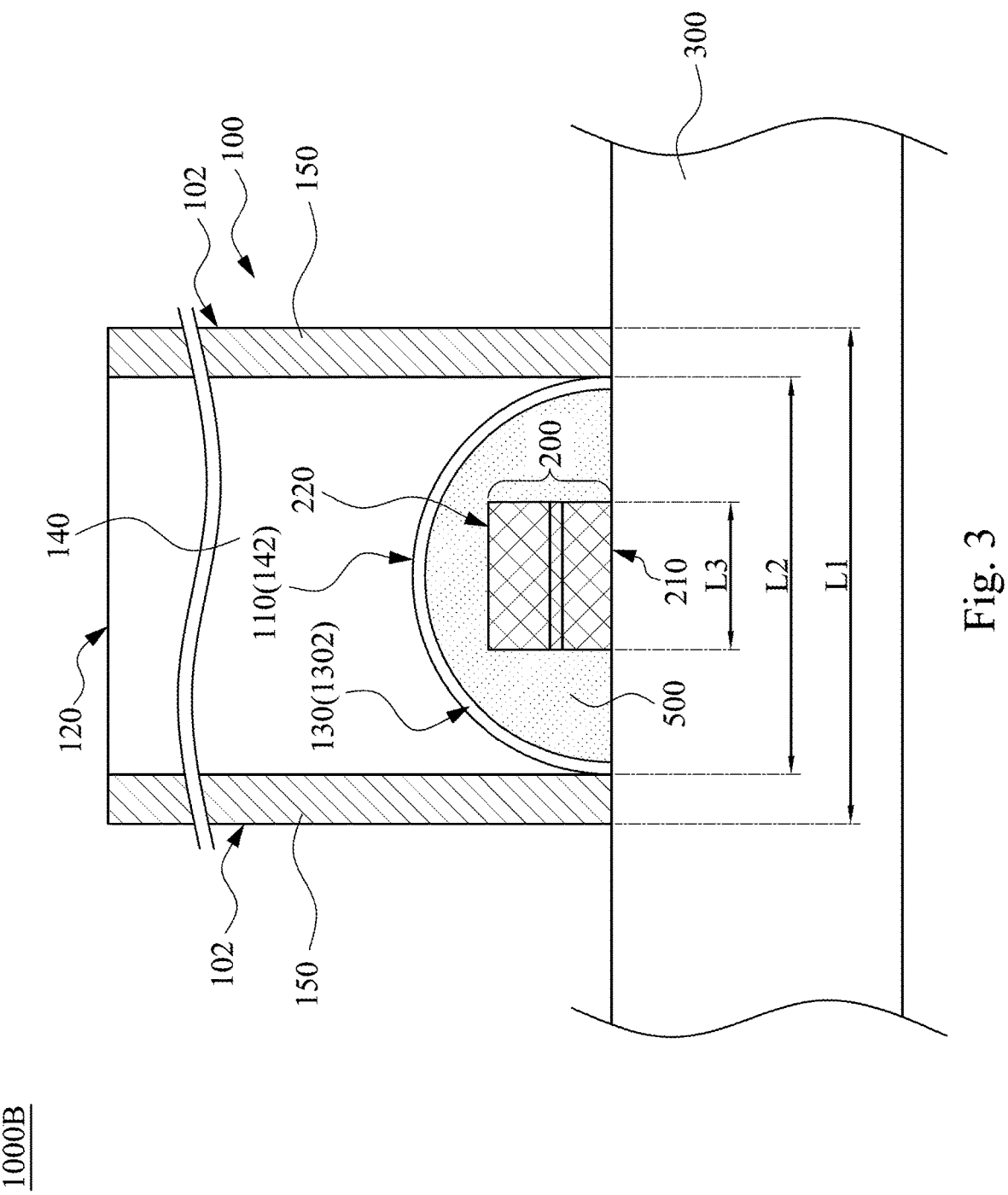
FIG. 3 is a schematic cross-sectional view of a direct coupling fiber-device structure according to some embodiments of the present disclosure.

Reference is made to FIG. 3. FIG. 3 is a schematic cross-sectional view of a direct coupling fiber-device structure 1000B according to some embodiments of the present disclosure. In some embodiments, the direct coupling fiber-device structure 1000B further includes a transparent layer 500 in the inner cavity 130 and between the micro device 200 and the first end 110 as compared to the direct coupling fiber-device structure 1000. A refractive index of the transparent layer 500 is greater than 1. In some embodiments, the refractive index of the transparent layer 500 is smaller than a refractive index of the micro device 200. The transparent layer 500 can be used to enhance light collection from the micro device 200 to the core portion 140 since the transparent layer 500 decreases an amount of difference between the refractive index of the micro device 200 and a refractive index outside the micro device 200. There may be an air gap 1302 between the transparent layer 500 and the core portion 140 (see FIG. 3) or no air gap 1302 between the transparent layer 500 and the core portion 140 (e.g., the transparent layer 500 is in contact with the core portion 140). As a result, reflections and energy losses of light during propagating out from the micro device 200 can be reduced.

Figure 4:
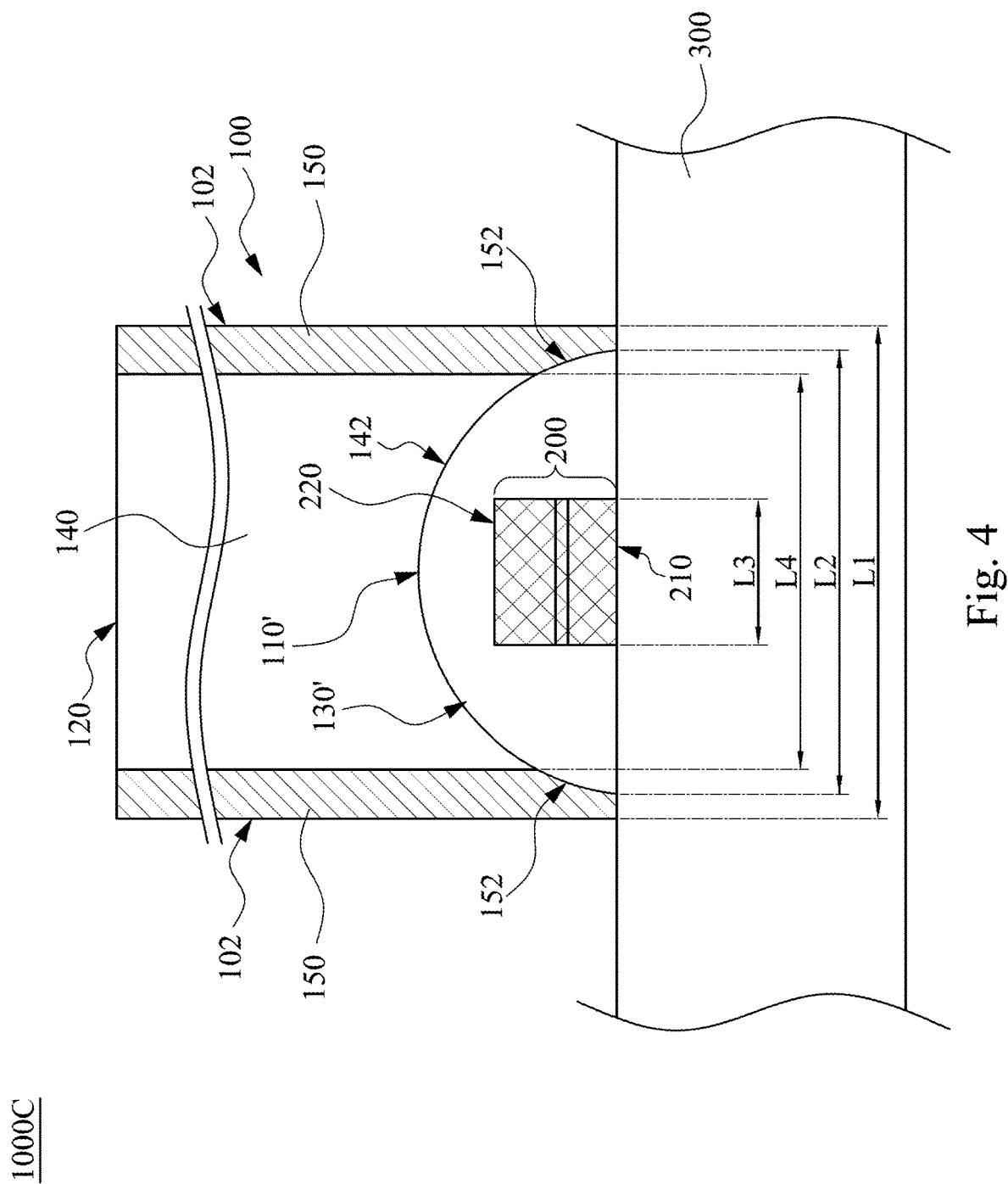
FIG. 4 is a schematic cross-sectional view of a direct coupling fiber-device structure according to some embodiments of the present disclosure.

Reference is made to FIG. 4. FIG. 4 is a schematic cross-sectional view of a direct coupling fiber-device structure 1000C according to some embodiments of the present disclosure. In some embodiments, the cladding layer 150 has a curved surface 152 connected with the curved surface 142 of the core portion 140. Specifically, the first end 110' of the optical fiber 100 is conformal to the curved surface 142 and the curved surface 152. In these embodiments, the inner cavity 130' extends to some space originally occupied by the cladding layer 150. This kind of configuration may be helpful for the direct coupling fiber-device structure 1000C operated in a single-mode type. Specifically, for a single-mode type to be operated, a lateral length L4 (see FIG. 4) of the core portion 140 is restricted to be smaller than those allowed to be operated in multi-modes. In order to have enough space for the inner cavity 130' to accommodate the micro device 200, the space included by the inner cavity 130' is expanded to the space originally occupied by the cladding layer 150. In some embodiments, the inner cavity 130' is defined by the core portion 140 and the cladding layer 150. In other words, a periphery of the inner cavity 130' is formed by the curved surface 142 of the core portion 140 and the curved surface 152 of the cladding layer 150.

Figure 5:
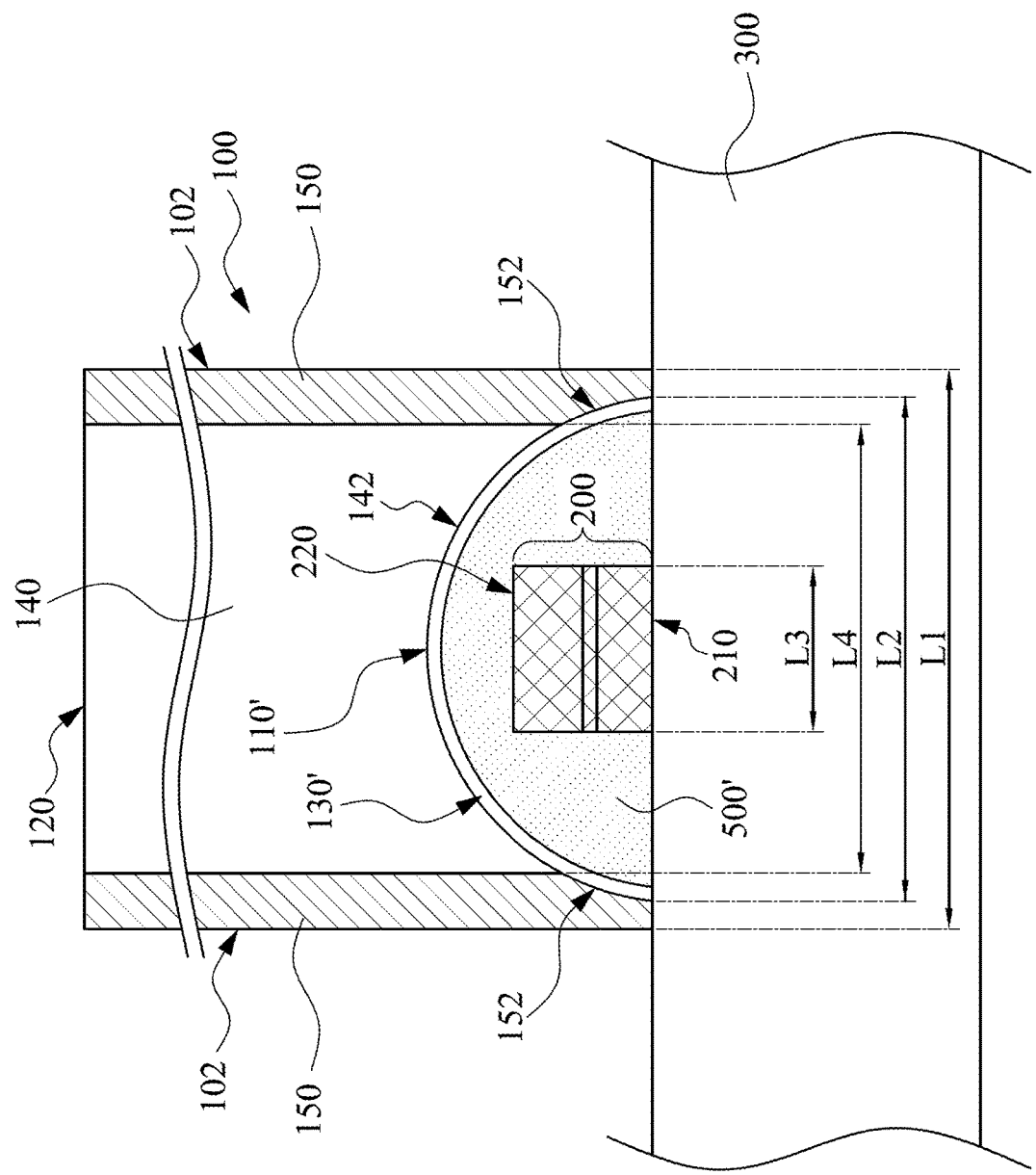
FIG. 5 is a schematic cross-sectional view of a direct coupling fiber-device structure according to some embodiments of the present disclosure.

Reference is made to FIG. 5. FIG. 5 is a schematic cross-sectional view of a direct coupling fiber-device structure 1000D according to some embodiments of the present disclosure. In some embodiments, the direct coupling fiber-device structure 1000D further includes the transparent layer 500' as compared to the direct coupling fiber-device structure 1000C as illustrated by FIG. 4. The function of the transparent layer 500' is identical or similar to the transparent layer 500 of the embodiments of FIG. 3 and will not be repeated herein.

Figure 6:
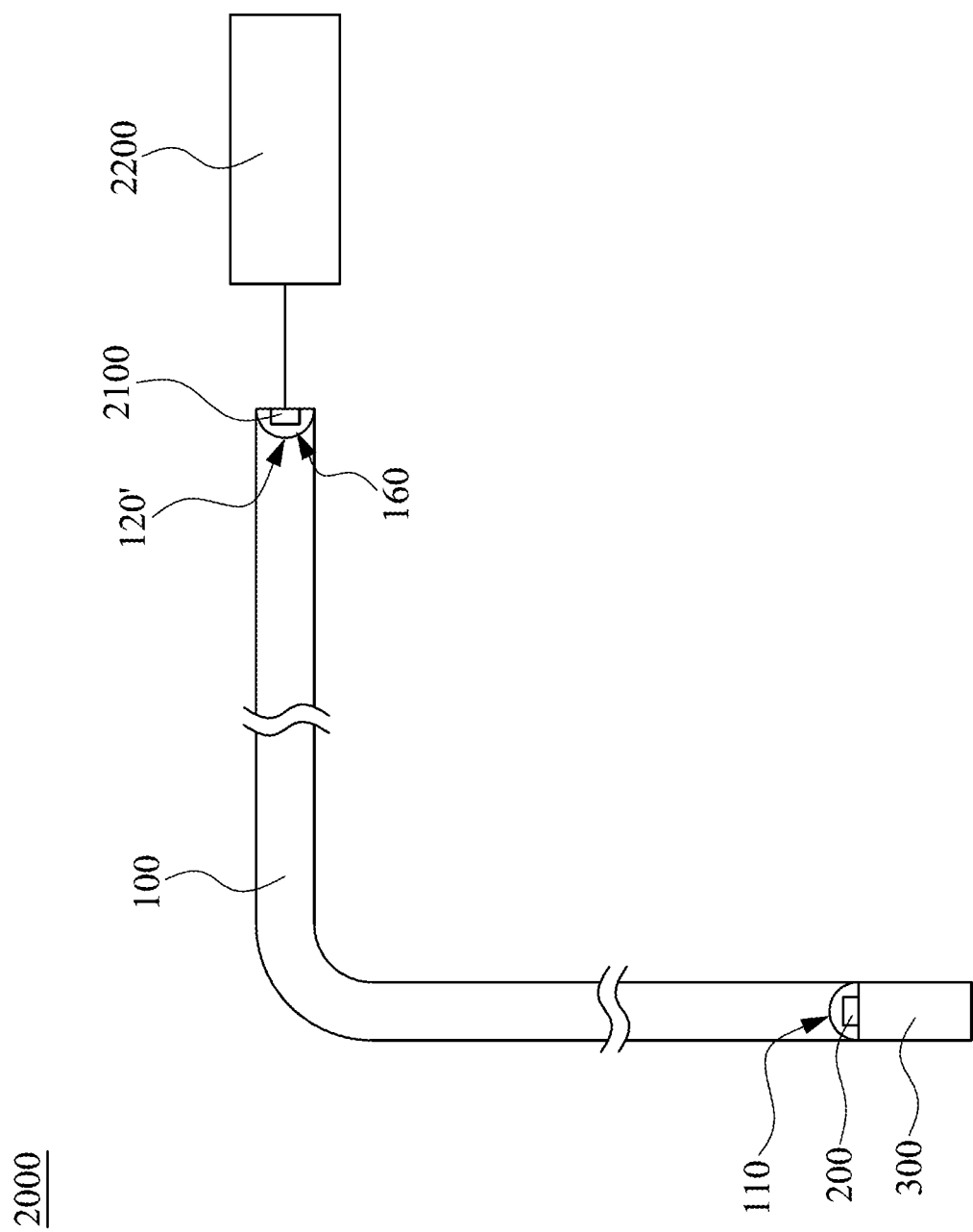
FIG. 6 is a schematic diagram of a direct coupling fiber-device structure according to some embodiments of the present disclosure.

Reference is made to FIG. 6. FIG. 6 is a schematic diagram of a direct coupling fiber-device structure 2000 according to some embodiments of the present disclosure. In some embodiments, the direct coupling fiber-device structure 2000 further includes a photoelectric transducer 2100 connected to the second end 120' of the optical fiber 100 as compared to the direct coupling fiber-device structure 1000. In some embodiments, another inner cavity 160 can be formed on the second end 120' of the optical fiber 100 to accommodate the photoelectric transducer 2100 so as to better receive light propagated in the optical fiber 100. In some embodiments, a lateral length of the photoelectric transducer 2100 is smaller than or equal to about 100 μm. In some embodiments, the photoelectric transducer 2100 is optionally connected to an optical spectrometer 2200 so as to measure and analyze light received by the photoelectric transducer 2100.

In summary, embodiments of the present disclosure provide a direct coupling fiber-device structure in which an intensity of light emitted from a single micro device, which is smaller compared to an intensity of light emitted from a traditional device, can be efficiently measured by fully accommodating the single micro device into an inner cavity of an optical fiber which is prepared to sense and measure the intensity of light emitted from the single micro device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the method and the structure of the present disclosure without departing from the scope or spirit of the disclosure. In view of the foregoing, it is intended that the present disclosure cover modifications and variations of this disclosure provided they fall within the scope of the following claims.

What is claimed is:

1. A direct coupling fiber-device structure, comprising:
   an optical fiber having a first end, a second end opposite to the first end, and an inner cavity recessed from the first end, the optical fiber comprising:
   a core portion; and
   a cladding layer wrapping the core portion and configured to confine a light beam to propagate within the core portion; and
   a micro device in the inner cavity and having a first surface substantially facing away from the first end and a second surface opposite to the first surface and facing toward the first end, wherein the micro device is spaced apart from the cladding layer.

2. The direct coupling fiber-device structure of claim 1, further comprising a base portion in contact with the first end, wherein the micro device is between the first end and the base portion.

3. The direct coupling fiber-device structure of claim 2, wherein the base portion is in contact with the first surface of the micro device.

4. The direct coupling fiber-device structure of claim 2, further comprising a supporting element connecting the optical fiber and the base portion, wherein the supporting element is in contact with an outer periphery of the optical fiber.

5. The direct coupling fiber-device structure of claim 1, further comprising a transparent layer in the inner cavity and between the micro device and the first end, wherein a refractive index of the transparent layer is greater than 1.

6. The direct coupling fiber-device structure of claim 5, wherein the refractive index of the transparent layer is smaller than a refractive index of the micro device.

7. The direct coupling fiber-device structure of claim 1, wherein the micro device is a micro light emitting device.

8. The direct coupling fiber-device structure of claim 1, wherein the micro device is a photo detecting device.

9. The direct coupling fiber-device structure of claim 1, wherein a lateral length of the optical fiber is greater than or equal to a lateral length of the inner cavity.

10. The direct coupling fiber-device structure of claim 1, wherein a lateral length of the micro device is smaller than a lateral length of the optical fiber.

11. The direct coupling fiber-device structure of claim 10, wherein the lateral length of the micro device is smaller than a lateral length of the inner cavity.

12. The direct coupling fiber-device structure of claim 1, wherein a lateral length of the micro device is smaller than or equal to about 100 μm.

13. The direct coupling fiber-device structure of claim 1, further comprising a photoelectric transducer connected to the second end of the optical fiber.

14. The direct coupling fiber-device structure of claim 1, wherein a refractive index of the cladding layer is smaller than a refractive index of the core portion.

15. The direct coupling fiber-device structure of claim 1, wherein the core portion has a curved surface at the first end of the optical fiber, and the curved surface forms at least a part of the inner cavity.

16. The direct coupling fiber-device structure of claim 15, wherein a shape of the curved surface is hemispherical.

17. The direct coupling fiber-device structure of claim 15, wherein the cladding layer has a curved surface connected with the curved surface of the core portion.

18. The direct coupling fiber-device structure of claim 1, wherein the inner cavity is defined by the core portion and the cladding layer.

* * * * *